(12) United States Patent
Chitaley et al.

(10) Patent No.: US 7,761,388 B2
(45) Date of Patent: Jul. 20, 2010

(54) PREDICTING A FUTURE PRICE RANGE FOR A DESIRED VOLUME

(75) Inventors: Ani D. Chitaley, Ashland, MA (US); Anthony Delisle, Revere, MA (US); Arun S. Gorur, North Andover, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 10/462,546

(22) Filed: Jun. 16, 2003

(65) Prior Publication Data

US 2004/0254870 A1    Dec. 16, 2004

(51) Int. Cl.
*G06Q 99/00*    (2006.01)
(52) U.S. Cl. .................. 705/400; 705/1.1; 705/35; 705/36; 705/37
(58) Field of Classification Search .................. 705/35, 705/36–37, 1, 1.1, 400; 107/104.1; 3/36, 3/37
See application file for complete search history.

(56) References Cited

U.S. PATENT DOCUMENTS

| | | | |
|---|---|---|---|
| 5,347,452 A * | 9/1994 | Bay, Jr. ...................... | 705/37 |
| 5,414,838 A * | 5/1995 | Kolton et al. ............. | 705/36 R |
| 5,778,357 A * | 7/1998 | Kolton et al. .............. | 707/2 |
| 6,012,042 A * | 1/2000 | Black et al. ................ | 705/36 |
| 6,272,474 B1 * | 8/2001 | Garcia ........................ | 705/37 |
| 6,317,728 B1 * | 11/2001 | Kane ........................... | 705/37 |
| 6,510,419 B1 | 1/2003 | Gatto | |
| 6,681,211 B1 * | 1/2004 | Gatto ......................... | 705/36 |
| 7,028,006 B1 * | 4/2006 | Marsden et al. ............ | 705/35 |
| 7,308,428 B1 * | 12/2007 | Federspiel et al. ....... | 705/36 R |
| 7,324,955 B1 * | 1/2008 | Ford et al. ................. | 705/10 |
| 7,650,305 B1 * | 1/2010 | Tenorio ..................... | 705/37 |
| 2002/0004774 A1 * | 1/2002 | Defarlo ...................... | 705/36 |
| 2002/0073017 A1 * | 6/2002 | Robertson .................. | 705/37 |
| 2003/0167224 A1 * | 9/2003 | Periwal ...................... | 705/37 |

FOREIGN PATENT DOCUMENTS

JP    56031158 A  *  3/1981
JP    2000-353196    12/2000

OTHER PUBLICATIONS http://attrasoft.com/predictorpro/chap0.html.*
http://atrasoft.com/abm2_6.html.*
Genci, Anthony F., "Measuring Preferred Trading Ranges and liquidity to Test Preferred Trading Range", 2003, The Katz Graduate School of Business, 152 pgs.*

(Continued)

*Primary Examiner*—John W Hayes
*Assistant Examiner*—Freda A Nelson
(74) *Attorney, Agent, or Firm*—Fish & Richardson P.C.

(57) ABSTRACT

A price range is determined based on a set of historical transactions having a comparison volume substantially corresponding to the desired volume of the traded item. A price range is also determined by selecting historical transactions such that the set of historical transactions has a total volume substantially equal to the comparison volume. A price range is also determined by selecting historical transactions such that the set of historical transactions has a total volume greater than the comparison volume and selectively removing one or more historical transactions from the set of historical transactions until the set of historical transactions has a total volume substantially equal to the comparison volume.

50 Claims, 2 Drawing Sheets

OTHER PUBLICATIONS

Meyers, Thomas, "A Guide to On-line Investing", May 27, 1986, PC Magazine, v5, n10, p. 213(13).*

Wayne H. Wagner, "Defining Best Execution," AIMR Conference Proceedings, Best Execution and Portfolio Performance, AIMR (Association for Investment Management), May 2001, Virginia.

Larry Harris, "Liquidity and Transaction Cost Measurement," Trading and Exchanges Market Microstructure for Practitioners, Oxford University Press, 2003, pp. 420-441.

Ian Domowitz et al., "Global Equity Trading Costs," ITG Research Papers, May 8, 2001. http://www.itginc.com/research/whitepapers/.

Peter Lert, "Methods of Measuring Transaction Costs," Investment Guides, Transaction Costs—A Cutting-Edge Guide to Best Execution, Spring 2001, NY, pp. 44-48.

Stephen A. Berkowitz and Dennis E. Logue, "Transaction Costs," The Journal of Portfolio Management, Winter 2001, vol. 27, No. 2, pp. 65-74.

George Sofianos and Jeff Bacidore, "Trading and Market Structure," Goldman Sachs Derivatives and Trading Research, Oct. 24, 2002, pp. 1-15.

Hans R. Stoll, "Equity Trading Costs In-The-Large," The Journal of Portfolio Management, Summer 1993, vol. 19, No. 2, pp. 41-50.

The International Search Report and The Written Opinion of the International Searching Authority, or the Declaration for International (Date of Mailing Nov. 3, 2004) Application No. PCT/US04/18809, filed Jun. 14, 2004.

Kissell et al., "Optimal Trading Strategies—Quantitative Approaches for Managing Market Impact and Trading Risk," Chapter 13, Post-Trade Analysis, pp. 337-370 (2003).

Communication from a foreign patent office in a counterpart foreign application (Written Opinion from Singapore Application No. 200508121-1, dated Feb. 9, 2007).

Robert Kissell and Morton Glantz, Optimal Trading Strategies—Quantitative Approaches for Managing Market Impact and Trading Risk, Chapter 13, Post-Trade Analysis, pp. 337-370, Amacom, 2003.

* cited by examiner

PREDICTING A FUTURE PRICE RANGE FOR A DESIRED VOLUME

TECHNICAL FIELD

This description relates to predicting a future price range for a desired volume.

BACKGROUND

Historical data about transactions occurring in a market for traded items of value (referred to sometimes simply as traded items), such as stocks, bonds, and derivatives, are typically published by the market or by another, unrelated entity. Such historical data can include for each transaction, for example, the time of the transaction, the price per traded item for that transaction, and the number of the traded items bought and sold in that transaction (i.e., the volume of the transaction). In some markets, the volume of the transaction can affect the price of the transaction. For example, an offer by a seller to sell (or a buyer to buy) a large volume of a particular traded item can put downward (or upward) pressure on the price for that traded item.

SUMMARY

The present invention provides methods and apparatus, including computer program products, to predict a future price range for a desired volume of a traded item. In general, in one aspect, there is a method to predict a future price range for a desired volume of a traded item. The method includes determining a price range based on a set of historical transactions having a comparison volume corresponding to the desired volume of the traded item. Other embodiments can include one or more of the following features. Selecting transactions from historical transaction data to generate the set of historical transactions. Selecting historical transactions such that the set of historical transactions has a total volume substantially equal to the comparison volume. Selecting historical transactions such that the set of historical transactions has a total volume greater than the comparison volume and selectively removing one or more historical transactions from the set of historical transactions until the set of historical transactions has a total volume substantially equal to the comparison volume. This can also include selectively removing a historical transaction that has a highest price from the set of historical transactions and/or selectively removing a historical transaction that has a lowest price from the set of historical transactions.

The method can also include selecting a first historical transaction from the historical transaction data and repeatedly selecting other historical transactions preceding the previously selected transaction until the set of transactions has a total volume substantially equal to the comparison volume. The first historical transaction can correspond to a transaction from the historical transaction data that happened most recently. Selecting can further include repeatedly selecting another transaction immediately preceding the previously selected transaction.

In some examples, the set of historical transactions is a first set of historical transactions. In these examples the method includes selecting an additional number of sets of historical transactions from the historical transaction data and determining a price range based on the first and the additional number of sets of historical transactions. Each set of historical transactions can have a total volume substantially equal to comparison volume. The method can also include enabling a user to define the additional number of sets of transactions. The method can also include ordering the historical transaction data. The ordering can be based on price. The historical transaction data can include timing data.

The method can also include determining an execution time for the set of historical transactions. This can be determined based on a chronologically first transaction and a chronologically last transaction. This can also be determined after selectively removing one or more historical transactions. The method can also include averaging the execution time for the set of historical transactions with another execution time corresponding to another set of transactions. The method can also include displaying the execution time and/or the average time. The historical transaction data can include published transactions from a trading market. Selecting can include multiplying a volume of a transaction by a multiplier. The multiplier can be based on a fixed percentage, a random function, an exponential function, and/or a logarithmic function. The method can also include displaying the determined price range. The comparison volume of the set of historical transactions can substantially equal the desired volume of a traded item. The traded item can include a stock or a bond. The comparison volume can be based on a percentage of the average daily volume.

The method can also include determining a price change based on the set of historical transactions. Determining a price change can include determining a first price and a second price, and determining a price change based on the difference between the first price and the second price. The first price can include a price associated with a chronologically first historical transaction in the set of historical transactions. The second price can include a price associated with a chronologically last historical transaction in the set of historical transactions. The second price can include an average price associated with the set of historical transactions. The method can also include determining a price range based on the price change and a current market condition associated with the traded item.

In some examples, the method can also include determining a price range based on a plurality of sets of historical transactions. In these examples, the method can also include determining an associated price change for each set of historical transactions. The method can also include determining a plurality of price changes, where each price change corresponds to a respective set of historical transactions. The method can include selecting a highest price change from the plurality of price changes. The method can include selecting a lowest price change from the plurality of price changes. The method can include determining an average price change associated with the plurality of price changes.

In general, in another aspect, there is a method to predict a future price range for a desired large volume of a traded item. The method includes selecting a set of transactions, from historical transaction data associated with the traded item, based on the large desired volume, determining pricing statistics based on the set of transactions, and determining the future price range based on the pricing statistics. Other embodiments may include one or more of the following features. Determining at least one of a highest price, a lowest price, and an average price for the set of transactions, identifying a base price associated with the set of transactions, and determining a difference between the base price and the highest price, the lowest price, and/or the average price.

The method can also include combining the difference with a current transaction price. The method can also include determining a time between a first and a last transaction in the set of transactions. In other examples, the set of transactions is a first set of transactions and the pricing statistics is a first set of pricing statistics. In these examples, the method can also include selecting a second set of transactions associated with the traded item based on the desired volume and determining a second set of pricing statistics based on the second set of transactions and a price associated with a transaction preceding the second set of transactions. The method can also include determining the future price range based on the first set of pricing statistics and the second set of pricing statistics. The first set of transactions and the second set of transactions can be consecutive. The first set of transactions and the second set of transactions both can occur in a same day. The method can also include transmitting the price range via a network.

In general, in another aspect, there is system to predict a future price range for a desired volume of a traded item that includes a computing device. The computing device is configured to determine a price range based on a set of historical transactions having a comparison volume corresponding to the desired volume of the traded item. The computing device can be further configured to select transactions from historical transaction data to generate the set of historical transactions. The computing device can be further configured to render the price range. The computing device can be further configured to generate a user interface to render the price range to a user. The computing device can be further configured to generate a user interface to enable the user to enter an input representing the traded item and an input representing the desired volume. The system can also include a transceiver configured to transmit the price range to a network device.

In general, in another aspect, there are one or more articles comprising a machine-readable medium storing instructions operable to cause one or more machines to perform the above methods.

Other features and advantages of the invention will be apparent from the description and from the claims.

DESCRIPTION

Figure 1:
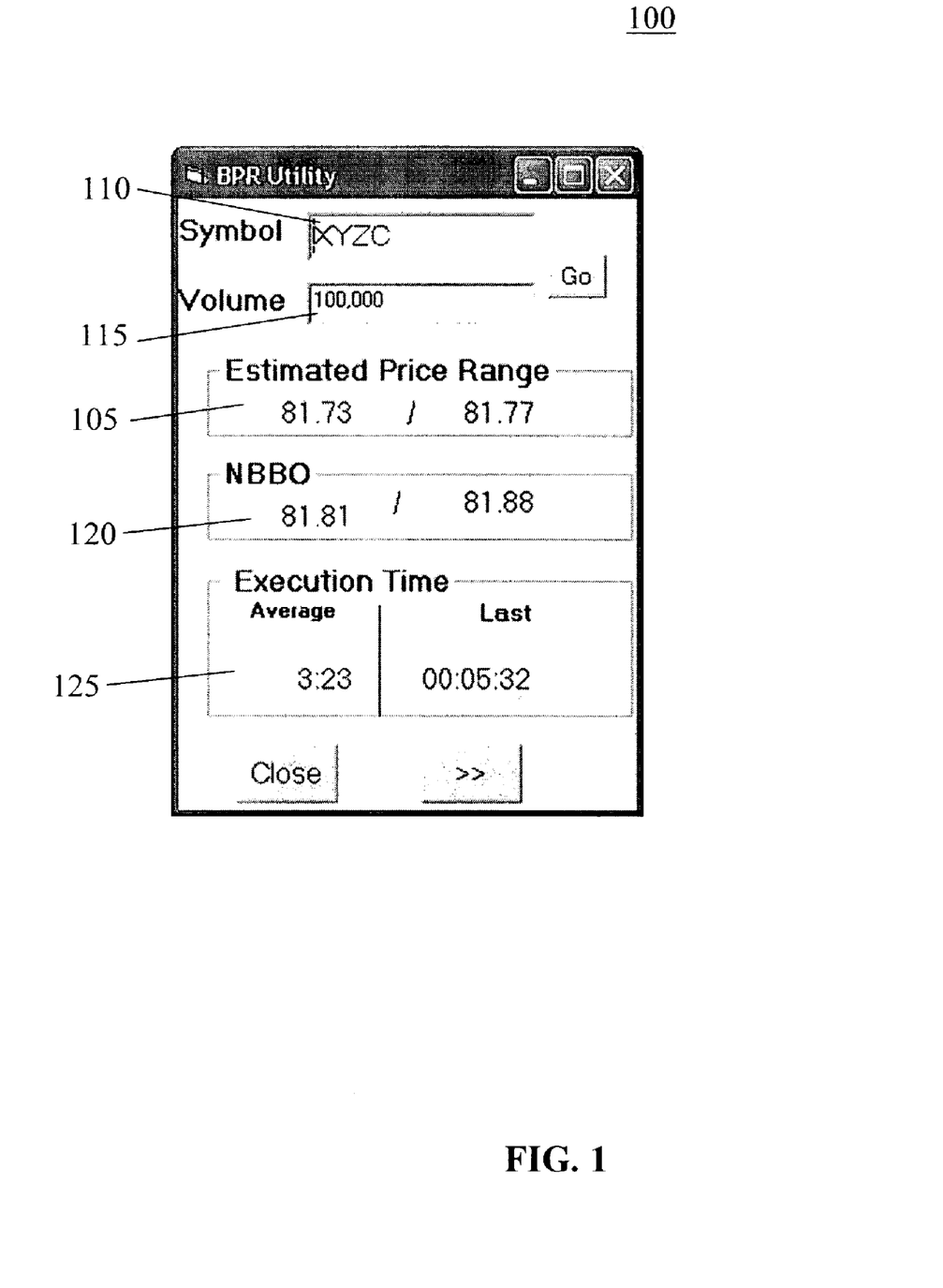
FIG. 1 is a block diagram of a user interface.

In the example user interface 100 of FIG. 1, box 105 displays a price range for a desired volume of a traded item of value to a user. Traded items of value can include, for example, securities, other financial instruments, commodities, and other items where, for example, volume affects price. The price range of the volume is a predicted price range within which a volume of a predetermined size of a selected traded item is expected to trade (that is, for which there is predicted to be a high likelihood of fulfilling a buy or sell order) based on recent market conditions. To get the predicted price range, the user enters an identifier for the particular traded item in box 110 and a desired volume in box 115. In the illustrated example, the traded item is a share of stock in XYZ Corp., whose symbol on the associated trading market is XYZC, as illustrated in box 110. The desired volume to be traded is 100,000 shares, as illustrated in box 115.

The price range of the volume displayed in box 105 is a predicted price range within which a volume of 100,000 shares of XYZ Corp. would be expected to trade based on recent market conditions. As described in more detail below, a computer program calculates the price range of the volume for the user inputs in boxes 110 and 115 based on available historical transaction data that corresponds to the desired volume. As illustrated, the National Best Bid and Offer (NBBO) in box 120 has a range of 81.81-81.88. The determined price range of the volume in box 115 is 81.73-81.77. This difference shows a predicted negative offset, based on market conditions, associated with trading a large volume of 100,000 shares of XYZ Corp. as compared with the current quoted price range for smaller volumes. This information is useful for a trader who wants to buy or sell the entered volume of the entered traded item, as it displays a reasonable price range based on the desired volume and market conditions. The computer program determines a comparison volume that corresponds to the desired volume in box 115 and analyzes price changes in one or more sets of historical transaction data, using the comparison volume to define how many transactions are included in each of the one or more sets.

Figure 2:
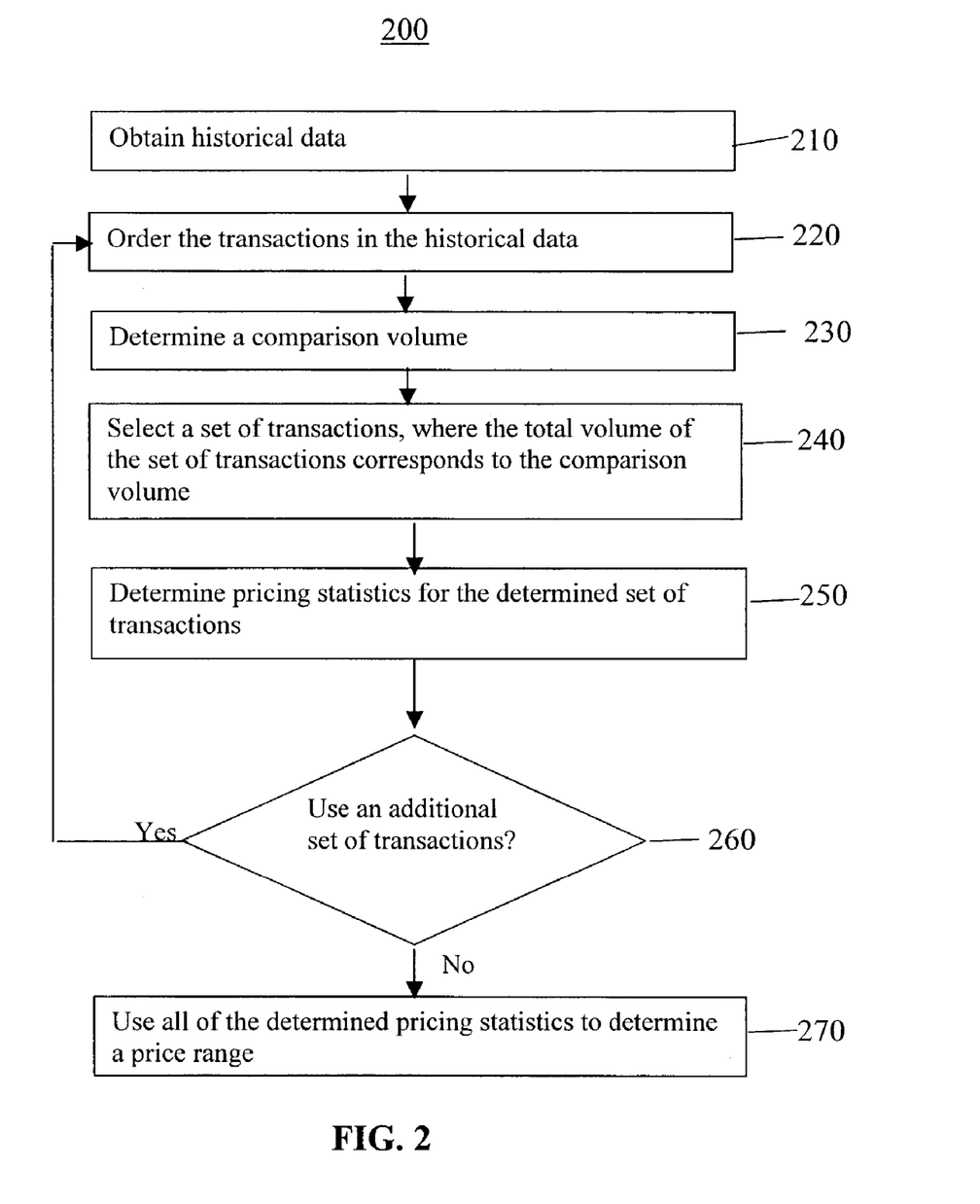
FIG. 2 is a block diagram of a process to determine a price range.

FIG. 2 illustrates process 200, which determines the price range of the volume. Process 200 obtains 210 historical data associated with the selected traded item (e.g., represented by the symbol entered in box 110, FIG. 1). This historical data can be obtained 210, for example, from a database or from a real-time feed provided by the trading market in which the desired traded item is traded. The historical data includes information about transactions that take place in the trading market. To help in clarifying the description of process 200, Table 1 provides an example of the most recent 123 historical transactions for the traded item shares of XYZC. Transactions with the same price are combined simply to limit the length (i.e.,

TABLE 1

| Transaction Number(s) | Time of Last Transaction | Volume in Shares | Price |
|---|---|---|---|
| 1 | 11:00:00 | 1000 | 81.80 |
| 2 | 10:59:59 | 1100 | 81.79 |
| 3 | 10:59:58 | 1000 | 81.81 |
| 4-10 | 10:59:57 | 7000 (1000 each transaction) | 81.83 |
| 11-15 | 10:59:56 | 5500 (1100 each transaction) | 81.84 |
| 16 | 10:59:55 | 900 | 81.85 |
| 17 | 10:59:54 | 800 | 81.86 |
| 18-28 | 10:59:53 | 12100 (1100 each transaction) | 81.84 |
| 29-34 | 10:59:52 | 6000 (1000 each transaction) | 81.82 |
| 35-37 | 10:59:51 | 3600 (1200 each transaction) | 81.79 |
| 38 | 10:59:50 | 1400 | 81.78 |
| 39 | 10:59:49 | 1200 | 81.81 |
| 40 | 10:59:48 | 1400 | 81.80 |
| 41-44 | 10:59:47 | 5000 (1250 each transaction) | 81.79 |
| 45-50 | 10:59:46 | 6000 (1000 each transaction) | 81.78 |
| 51-56 | 10:59:45 | 6600 (1100 each transaction) | 81.77 |
| 57 | 10:59:44 | 1000 | 81.76 |
| 58 | 10:59:43 | 1000 | 81.75 |
| 59-66 | 10:59:42 | 8000 (1000 each transaction) | 81.77 |
| 67-74 | 10:59:41 | 8000 (1000 each transaction) | 81.80 |
| 75-81 | 10:59:40 | 7700 (1100 each transaction) | 81.82 |
| 82-85 | 10:59:39 | 5000 (1250 each transaction) | 81.83 |
| 86-91 | 10:59:38 | 6000 (1000 each transaction) | 81.85 |
| 92 | 10:59:37 | 900 | 81.87 |
| 93 | 10:59:36 | 1000 | 81.89 |
| 94 | 10:59:35 | 1100 | 81.92 |
| 95 | 10:59:34 | 900 | 81.90 |
| 96-101 | 10:59:33 | 6000 (1000 each transaction) | 81.91 |
| 102 | 10:59:32 | 900 | 81.86 |
| 103-106 | 10:59:31 | 4000 (1000 each transaction) | 81.88 |
| 107-112 | 10:59:30 | 6600 (1100 each transaction) | 81.90 |
| 113-120 | 10:59:29 | 8000 (1000 each transaction) | 81.88 |
| 121 | 10:59:28 | 800 | 81.92 |
| 122 | 10:59:27 | 900 | 81.94 |
| 123 | 10:59:26 | 1000 | 81.90 | number of rows) of the table. Such historical data can include for each transaction, for example as illustrated in Table 1, the time of the transaction, the price per traded item for that transaction and the number of the traded item bought and sold in that transaction (i.e., the volume of the transaction). Process 200 orders 220 the historical data based on how process 200 determines 250 pricing statistics, as described in more detail below. For example, using the transaction data in Table 1, process 200 orders the transactions in reverse chronological order. That is, transaction 1 is the most recent transaction, occurring at time 11:00:00 and the other transactions proceed backwards in time.

Process 200 determines 230 a comparison volume, also based on how process 200 determines 250 pricing statistics. For this example, the comparison volume equals the desired volume (e.g., 100,000 shares, the amount entered in box 115, FIG. 1). Process 200 selects 240 a set of transactions that correspond to the comparison volume. To select 240 the set of transactions, process 200 adds the volume of each transaction in the ordered history until the total volume equals or exceeds the comparison volume. Based on how process 200 determines 250 pricing statistics, process 200 uses a multiplier that represents a percentage of the transaction volume that process 200 wants to use. For this simple example, process 200 uses a fixed multiplier corresponding to a percentage of 100% for each transaction (i.e., a multiplier of 1). Using the example data in Table 1, process 200 selects transactions 1-94 for the set of historical transactions. The total volume of these transactions equals 100,300 shares, just over the desired volume of 100,000 shares. As illustrated in this selected set of transaction, in some cases, the total volume of the set of transactions cannot identically equal the comparison volume. If process 200 selected transactions 1-93, the total volume of these transactions equals 99,200 shares. In this case, because neither the first 93 nor the first 94 consecutive transactions identically equal 100,000 shares, process 200 can use the first 94 transactions because the total volume of the first 94 transactions substantially equal the comparison volume. That is, the total volume of the first 94 transactions come as close to the comparison volume as the transactions allow without taking a partial transaction.

In another example, process 200 uses a partial volume of the $94^{th}$ transaction by changing the multiplier for that last transaction in the set to 0.7272 (i.e., 72.72%) to make the set of transaction have a total volume identically equal to the comparison volume. In that example, process 200 selects 240 a set of transactions so that the total volume of the set is greater than the comparison volume. This allows process 200 to use a multiplier less than one for the last transaction to make the total volume equal to the comparison volume.

For the selected set of transactions (e.g., the first 94 most recent transactions), process 200 determines 250 pricing statistics. Process 200 can use several different techniques. For example, for a consecutive set of historical transactions, process 200 determines 250 the highest price for the set of transactions, the lowest price in the set of transactions, the median price in the set of transactions and the volume weighted average price (VWAP) of the set of transactions. Using the example of the first 94 transactions in Table 1, the highest price of the set occurs at transaction 94, which has a price of 81.92. The lowest price of the set occurs at transaction 58, which has a price of 81.75. The VWAP of the set of transactions is 81.8126. The mean price of the set of transactions is 81.82.

Process 200 then determines 260 whether an additional set of transactions should be selected. Process 200 uses a predetermined number of additional sets of transactions. This predetermined number can be set, for example, by an administrator, or a user. If process 200 determines 260 that an additional set of transactions should be used (i.e., predetermined number has not been analyzed), process 200 repeats blocks 220, 230, 240, and 250. For example, using the data in Table 1, with the same ordering and the same comparison volume, process 200 selects 240 another set of transactions, starting with transaction 95 and proceeding backwards in time until another set of consecutive transactions has a total volume of approximately 100,000 shares. Process 200 determines 250 the highest price, the lowest price, the median price, and the VWAP of this next set of transactions.

Once process 200 determines 260 that no additional sets of transactions are to be used, process 200 determines 270 the price range of the volume. If process 200 uses more than one set of transactions, process 200 combines like pricing statistics. For example, process 200 combines the determined high price from each set of transactions using known statistical methods (e.g., average, standard deviations, and the like) to determine a single high price for the price range. Process 200 repeats this statistical combination for each of the pricing statistics (e.g., lowest price, mean price, and VWAP) to determine a total price range for the desired volume. Process 200 can also combine the pricing statistics with each other to determine 270 a price range. For example, process 200 can average highest price and lowest price from the VWAP or the mean price to determine a symmetric range around the VWAP or mean price.

In the example above, process 200 determines 270 the price range by using the pricing statistics absolutely. Process 200 can also determine 270 the price range by using the pricing statistics relatively, compared to a base price and/or a current price. If relative, process 200 determines a price change associated with the set of transactions to apply that price change to, for example, a current market price. To determine a price change, process 200 determines a base price to compare with the set of transactions. The base price can be, for example, the first price, chronologically, in the set of transactions, the last price, chronologically, in the set of transactions, or the price of a transaction immediately preceding or following the set of transactions.

To determine 250 the relative pricing statistics, process 200 determines a delta high by subtracting the highest price among the selected set of transactions from the base price. Process 200 determines a delta low by subtracting the lowest price among the selected set of transactions from the base price. Process 200 determines a delta average by subtracting the VWAP price for the selected set of transactions from the base price. For example, referring to the data in Table 1, process 200 selects the first set of transactions as transactions 1-94 and selects the base price to be the price of transaction 95, 81.90. Process 200 determines the delta high to be the highest price of the set minus the base price, or 81.92-81.90, which is +0.02. Process 200 determines the delta low to be the lowest price of the set minus the base price, or 81.75-81.90, which is −0.15. Process 200 similarly determines the delta VWAP and the delta mean prices. These deltas are statistically combined (e.g., averaged) with deltas from any additional sets of transactions, to arrive a single set of pricing statistic deltas. These pricing statistic deltas are the relative pricing statistics that process 200 uses to determine 270 the price range for the desired volume. For example, process 200 selects the most current market price, which, using Table 1, is reflected in transaction 1 with a price of 81.80. Process 200 combines the deltas with the current market price to predict a future price range for the desired volume.

In another example, process 200 starts with a group of historical transactions having a total volume greater than the comparison volume and selectively removes transactions from this group until there is a set of transactions with a total volume approximately equal to the comparison volume. Process 200 can selectively remove transactions based on, for example, highest or lowest prices. Using the data of Table 1, process 200 uses all 123 transactions, which have a total volume of 129,400 shares. To selectively remove transactions, process 200 orders 200 the historical data by price in descending order. Table 2 includes this ordered data. Process

TABLE 2

| Transaction Number(s) | Time of Last Transaction | Volume in Shares | Price |
|---|---|---|---|
| 122 | 10:59:27 | 900 | 81.94 |
| 94 | 10:59:35 | 1100 | 81.92 |
| 121 | 10:59:28 | 800 | 81.92 |
| 96-101 | 10:59:33 | 6000 (1000 each transaction) | 81.91 |
| 95 | 10:59:34 | 900 | 81.90 |
| 107-112 | 10:59:30 | 6600 (1100 each transaction) | 81.90 |
| 123 | 10:59:26 | 1000 | 81.90 |
| 93 | 10:59:36 | 1000 | 81.89 |
| 103-106 | 10:59:31 | 4000 (1000 each transaction) | 81.88 |
| 113-120 | 10:59:29 | 8000 (1000 each transaction) | 81.88 |
| 92 | 10:59:37 | 900 | 81.87 |
| 17 | 10:59:54 | 800 | 81.86 |
| 102 | 10:59:32 | 900 | 81.86 |
| 16 | 10:59:55 | 900 | 81.85 |
| 86-91 | 10:59:38 | 6000 (1000 each transaction) | 81.85 |
| 11-15 | 10:59:56 | 5500 (1100 each transaction) | 81.84 |
| 18-28 | 10:59:53 | 12100 (1100 each transaction) | 81.84 |
| 4-10 | 10:59:57 | 7000 (1000 each transaction) | 81.83 |
| 82-85 | 10:59:39 | 5000 (1250 each transaction) | 81.83 |
| 29-34 | 10:59:52 | 6000 (1000 each transaction) | 81.82 |
| 75-81 | 10:59:40 | 7700 (1100 each transaction) | 81.82 |
| 3 | 10:59:58 | 1000 | 81.81 |
| 39 | 10:59:49 | 1200 | 81.81 |
| 1 | 11:00:00 | 1000 | 81.80 |
| 40 | 10:59:48 | 1400 | 81.80 |
| 67-74 | 10:59:41 | 8000 (1000 each transaction) | 81.80 |
| 2 | 10:59:59 | 1100 | 81.79 |
| 35-37 | 10:59:51 | 3600 (1200 each transaction) | 81.79 |
| 41-44 | 10:59:47 | 5000 (1250 each transaction) | 81.79 |
| 38 | 10:59:50 | 1400 | 81.78 |
| 45-50 | 10:59:46 | 6000 (1000 each transaction) | 81.78 |
| 51-56 | 10:59:45 | 6600 (1100 each transaction) | 81.77 |
| 59-66 | 10:59:42 | 8000 (1000 each transaction) | 81.77 |
| 57 | 10:59:44 | 1000 | 81.76 |
| 58 | 10:59:43 | 1000 | 81.75 |

200 selects 240 a set of transactions by selecting the transactions in order, as ordered in Table 2, until the total volume of the selected transactions approximately equals the comparison volume. In this case, the set of transactions, starting with the highest price of transaction 122 includes all of the rows from transaction 122 to the row containing transactions 35-37. The total volume of this set of transactions is 100,400 shares. The pricing statistics of this set of transactions is different from the example described above using the chronological ordering. The highest price of this set is at transaction 122, which is 81.94. The lowest price of this set is at transaction 37, which is 81.79. The VWAP of this set is 81.8472.

In another example, using the data of Table 1, process 200 selectively removes transactions, by ordering 200 the historical data by price in ascending order. Table 3 includes this ordered data. Process 200 selects 240 a set of transactions by selecting the transactions in order, as ordered in Table 3 until the total volume of the selected transactions approximately equals the comparison volume. In this case, the set of transactions, starting with the lowest price of transaction 58 includes all of the rows from transaction 58 to the row containing transactions 103-106, but only including transaction 103 of that row. The total volume of this set of transactions is 100,100 shares. The pricing statistics of this set of transactions is different also. The highest price of this set is at transaction 103, which is 81.88. The lowest price of this set is at transaction 58, which is 81.75. The VWAP of this set is 81.8118.

Process 200 can determine 270 the price range by using the pricing statistics for the sets associated with Table 2 and Table 3 alone or in combination, and/or absolutely or relatively as described above. Because the data is ordered according to price, from highest or lowest, process 200 can determine 270 the price range in yet another way. For a high price in the price range, process 200 can use the VWAP of the set of transactions ordered in descending order (i.e., the set associated with Table 2). Similarly, for a low price in the price range, process 200 can use the VWAP of the set of transactions ordered in ascending order (i.e., the set associated with Table 3). These two VWAPs can be used absolutely to establish the price range limits, or they can be used relative to a base price, to determine a price change to be applied to a current price.

TABLE 3

| Transaction Number(s) | Time of Last Transaction | Volume in Shares | Price |
|---|---|---|---|
| 58 | 10:59:43 | 1000 | 81.75 |
| 57 | 10:59:44 | 1000 | 81.76 |
| 51-56 | 10:59:45 | 6600 (1100 each transaction) | 81.77 |
| 59-66 | 10:59:42 | 8000 (1000 each transaction) | 81.77 |
| 38 | 10:59:50 | 1400 | 81.78 |
| 45-50 | 10:59:46 | 6000 (1000 each transaction) | 81.78 |
| 2 | 10:59:59 | 1100 | 81.79 |
| 35-37 | 10:59:51 | 3600 (1200 each transaction) | 81.79 |
| 41-44 | 10:59:47 | 5000 (1250 each transaction) | 81.79 |
| 1 | 11:00:00 | 1000 | 81.80 |
| 40 | 10:59:48 | 1400 | 81.80 |
| 67-74 | 10:59:41 | 8000 (1000 each transaction) | 81.80 |
| 3 | 10:59:58 | 1000 | 81.81 |
| 39 | 10:59:49 | 1200 | 81.81 |
| 29-34 | 10:59:52 | 6000 (1000 each transaction) | 81.82 |
| 75-81 | 10:59:40 | 7700 (1100 each transaction) | 81.82 |
| 4-10 | 10:59:57 | 7000 (1000 each transaction) | 81.83 |
| 82-85 | 10:59:39 | 5000 (1250 each transaction) | 81.83 |
| 11-15 | 10:59:56 | 5500 (1100 each transaction) | 81.84 |
| 18-28 | 10:59:53 | 12100 (1100 each transaction) | 81.84 |
| 16 | 10:59:55 | 900 | 81.85 |
| 86-91 | 10:59:38 | 6000 (1000 each transaction) | 81.85 |
| 17 | 10:59:54 | 800 | 81.86 |
| 102 | 10:59:32 | 900 | 81.86 |
| 92 | 10:59:37 | 900 | 81.87 |
| 103-106 | 10:59:31 | 4000 (1000 each transaction) | 81.88 |
| 113-120 | 10:59:29 | 8000 (1000 each transaction) | 81.88 |
| 93 | 10:59:36 | 1000 | 81.89 |
| 95 | 10:59:34 | 900 | 81.90 |
| 107-112 | 10:59:30 | 6600 (1100 each transaction) | 81.90 |
| 123 | 10:59:26 | 1000 | 81.90 |
| 96-101 | 10:59:33 | 6000 (1000 each transaction) | 81.91 |
| 94 | 10:59:35 | 1100 | 81.92 |
| 121 | 10:59:28 | 800 | 81.92 |
| 122 | 10:59:27 | 900 | 81.94 |

In another example, process 200 only uses a portion of the volume of each transaction. In other words, the multiplier is not 1. For example, process 200 can use a multiplier of 0.8 for each transaction (i.e., use 80%). Using the data of Table 1 and a multiplier of 0.8, process 200 uses transactions 1-119. The total volume of these transactions is 125,700 shares, but because process 200 is using 80% of the volume of the transactions for its set, the set of transactions has a total volume of 100,560 shares, approximately equal to the comparison volume of 100,000 shares. The multiplier does not have to be fixed. Process 200 can apply a variable multiplier, so that process 200 applies a different multiplier to each transaction. Process 200 can variably apply a multiplier using a number of different functions. For example, process 200 can apply the variable multiplier randomly. That is, using the data in Table 1, process 200 applies a first randomly generated multiplier, from 0 to 1 exclusively, to the first transaction (i.e., transaction 1). Process 200 applies a second randomly generated multiplier to the second transaction (i.e., transaction 2) and so on, adding the calculated volume (i.e., multiplier * transaction volume), until the total volume equals the comparison volume. Similarly, process 200 can also apply an exponentially increasing or decreasing variable multiplier, a logarithmically variable multiplier, a sinusoidal multiplier, or use some other mathematical function.

In another example, process 200 also determines the time that transpires executing a set of transactions that is equivalent to the desired volume. Referring back to FIG. 1, box 125 displays both an average time for execution and the last execution time. The last execution time refers to the execution time for the most recent set of historical transactions. For example, using the data of Table of 1, transactions 1-94 occur in a period of 25 seconds. That is, because Table 1 is a list of consecutive transactions, the time of the desired volume is simply the difference between the first and last transactions (i.e., 10:59:35 to 11:00:00). The average execution time refers to the average for all of the sets of historical transactions for the desired volume. For example, for the three sets of transactions associated with Tables 1-3 process 200 determines an execution time for each set of transactions and then averages those three determined execution times to determine the average execution time. To determine an execution time for non-consecutive transactions (e.g., Tables 2 and 3), process 200 determines the first and last transactions, chronologically, and takes the difference in time. For example, using the data of Table 2, process 200 selects the row with transaction 122 to the row with transactions 35-37 for the set of transactions having a comparison volume substantially equal the desired volume. For this set, the first transaction, chronologically, is transaction 123, occurring at 10:59:26. The last transaction, chronologically, is transaction 1, occurring at 11:00:00. Process 200 determines the execution time for this set of transactions is 34 seconds (i.e., 10:59:26 to 11:00:00).

In the examples above, process 200 determines 230 the comparison volume by making the comparison volume equal to the desired volume. Process 200 can also determine 230 the comparison volume in other ways. In other words, the comparison volume can correspond to the desired volume in other ways in addition to being equal. One of the reasons that process 200 is needed is because the desired volume is a large volume for which a single transaction might not exist. The large volume affects the price of the item in the market, so process 200 attempts to estimate that effect based on one or more sets of historical transactions. Process 200 can also determine 230 the comparison volume using a large volume for a particular market. For example, for a stock, a large volume is considered 20% or more of the transacted volume for that stock, in the market. So, process 200 can determine that 20% of the market volume (e.g., from the previous day) is the comparison volume.

In addition or as an alternative to the user interface illustrated in FIG. 1, a computing device determining the price range for the desired volume can transmit the price range via a network to other computing devices. The price range can be published, for example, using a real-time feed, to one or more subscribers.

Other embodiments are within the scope of the following claims.

What is claimed is:

1. computer-implemented method of predicting a future price range for a desired volume of a traded item, the method comprising the computer-implemented steps of:

retrieving by a computer historical transactions represented by records of prior trades of the traded item, the records including for each prior trade a trade price and trade volume for the prior trade of the traded item;

defining a comparison volume at least in part based on the desired volume:

selecting by the computer one or more historical transactions;

comparing by the computer a total volume of the selected one or more historical transactions with the comparison volume;

determining by the computer based on the comparison that the selected one or more historical transactions have a total volume that substantially corresponds to the comparison volume;

deriving by the computer statistical information regarding a distribution of prices for the selected one or more historical transactions;

predicting the future price range for the desired volume at least in part based on the statistical information regarding the distribution of prices for the selected one or more historical transactions; and providing an output indicative of the prediction.

2. The method of claim 1 wherein comparing by the computer a total volume is a first comparing step, and selecting by the computer one or more historical transactions further comprises:

generating a first set of historical transactions based on the selected one or more historical transactions;

comparing the one or more historical transactions in the first set of historical transactions to the comparison volume;

determining by the computer based on the first comparison that the one or more historical transactions in the first set of historical transactions have a total volume greater than the comparison volume;

generating a second set of historical transactions by selectively removing one or more historical transactions from the first set of historical transactions;

comparing the one or more historical transactions in the second set of historical transactions to the comparison volume; and determining by the computer based on the second comparison that the one or more historical transactions in the set second of historical transactions have a total volume substantially equal to the comparison volume.

3. The method of claim 2, wherein selectively removing further comprises removing, from the first set of historical transactions, a historical transaction that has a highest price in the set of historical transactions.

4. The method of claim 2, wherein selectively removing further comprises removing, from the first set of historical transactions, a historical transaction that has a lowest price in the set of historical transactions.

5. The method of claim 2, further comprising determining, after selectively removing one or more historical transactions, an execution time for the first set of historical transactions based on a chronologically first transaction and a chronologically last transaction.

6. The method of claim 5, further comprising averaging the execution time for the first set of historical transactions with another execution time corresponding to another set of transactions.

7. The method of claim 1, wherein selecting by the computer one or more historical transactions further comprises:

selecting a first historical transaction from the one or more historical transactions; and repeatedly selecting historical transactions preceding the first historical transaction until a set of historical transactions has a total volume substantially equal to the comparison volume.

8. The method of claim 7, wherein the first historical transaction corresponds to a transaction from the one or more historical transactions that happened most recently.

9. The method of claim 7, wherein repeatedly selecting historical transactions preceding the first historical transaction further comprises repeatedly selecting another transaction immediately preceding the previously selected transaction.

10. The method of claim 9, further comprising determining an execution time to execute the set of transactions.

11. The method of claim 1, wherein the selected one or more historical transactions comprises a first set of historical transactions, the method further comprising:
    selecting an additional number of sets of historical transactions from the one or more historical transactions, and
    wherein predicting the future price range further comprises predicting a price range at least in part on the basis of the first and the additional number of sets of historical transactions.

12. The method of claim 11, wherein each set of historical transactions has a total volume substantially equal to the comparison volume.

13. The method of claim 11, further comprising receiving, from a user, information defining the additional number of sets of transactions.

14. The method of claim 1, further comprising ordering the one or more historical transactions.

15. The method of claim 14, wherein ordering the one or more historical transactions further comprises ordering the historical transactions data based on price.

16. The method of claim 1, further comprising determining an execution time to execute a set of historical transactions including the one or more selected historical transactions.

17. The method of claim 16, further comprising displaying the execution time.

18. The method of claim 16, further comprising averaging the execution time for the set of historical transactions with another execution time corresponding to another set of historical transactions to determine an average execution time.

19. The method of claim 18, further comprising displaying the average execution time.

20. The method of claim 1, wherein the one or more historical transactions further comprises published transactions from a trading market.

21. The method of claim 1, wherein selecting by the computer one or more historical transactions further comprises multiplying a volume of a historical transaction by a multiplier.

22. The method of claim 21, wherein the multiplier is based on one of a fixed percentage, a random function, an exponential function, and a logarithmic function.

23. The method of claim 1, wherein the comparison volume substantially equals the desired volume.

24. The method of claim 1, wherein the traded item comprises at least one of a stock and a bond.

25. The method of claim 1, wherein the comparison volume is based on a percentage of an average daily volume.

26. The method of claim 1, wherein predicting a price range further comprises predicting a price change based on the selected one or more historical transactions.

27. The method of claim 26, wherein predicting a price change further comprises:
    determining a first price;
    determining a second price; and
    predicting a price change based on a difference between the first price and the second price.

28. The method of claim 27, wherein the first price comprises a price associated with a chronologically first historical transaction in a set of historical transactions including the selected one or more historical transactions.

29. The method of claim 27, wherein the second price comprises a price associated with a chronologically last historical transaction in a set of historical transactions including the selected one or more historical transactions.

30. The method of claim 27, wherein the second price comprises an average price associated with a set of historical transactions including the selected one or more historical transactions.

31. The method of claim 27, wherein predicting a price range further comprises predicting a price range based at least in part on the price change and a current market condition associated with the traded item.

32. The method of claim 1, wherein predicting a price range further comprises predicting a price range based on a plurality of sets of historical transactions, the method further comprising determining an associated price change for each set of historical transactions.

33. The method of claim 32, wherein predicting a price range further comprises predicting a price range based on a plurality of sets of historical transactions, the method further comprising determining a plurality of price changes, each price change corresponding to a respective set of historical transactions.

34. The method of claim 32, wherein determining an associated price range further comprises selecting a highest price change from the plurality of price changes.

35. The method of claim 32, wherein determining an associated price range further comprises selecting a lowest price change from the plurality of price changes.

36. The method of claim 32, wherein determining an associated price range further comprises determining an average price change associated with the plurality of price changes.

37. A computer-implemented method of predicting a future price range for a desired volume of a traded item, the method comprising:
    Selecting, by a computer, a set of transactions from historical transaction data associated with the traded item, the selected set of transactions having an aggregate volume substantially corresponding to the desired volume of tile traded item;
    determining, by the computer, statistical information regarding a distribution of prices for the set of transactions based at least in part on the set of transactions;
    predicting the future price range based on the statistical information regarding the distribution of prices for the set of transactions; and
    providing an output indicative of the prediction.

38. The method of claim 37, wherein determining statistical information regarding a distribution of prices for the set of transactions further comprises:
    identifying a base price associated with the set of transactions; and
    determining a difference between the base price and at least one of the highest price, the lowest price, and the average price for the set of transactions.

39. The method of claim 38, wherein predicting the future price range further comprises:
    combining the difference with a current transaction price.

40. The method of claim 37, further comprising determining a time interval extending between a first and a last transaction in the set of transactions.

41. The method of claim 37, wherein the set of transactions is a first set of transactions and the statistical information are elements of a first set of statistical information, the method further comprising:
  selecting, at least in part on the basis of the desired volume, a second set of transactions associated with the traded item; and
  determining a second set of statistics statistical information regarding a distribution of prices for the second set of transactions based at least in part on the second set of transactions, and
  determining a price associated with a transaction preceding the second set of transactions,
  wherein predicting the future price range further comprises predicting the future price range based at least in part on the first set of statistical information and the second set of statistical information.

42. The method of claim 41, wherein the first set of transactions and the second set of transactions are consecutive.

43. The method of claim 41, wherein the first set of transactions and the second set of transactions both occur in a same day.

44. The method of claim 37, wherein providing an output comprises transmitting the price range via a network.

45. A computer program product residing on a non-transitory computer readable storage medium for predicting a future price range for a desired volume of a traded item, the computer program product comprising instructions for causing a computer to:
  retrieve by using a computer, historical transactions represented by records of prior trades of the traded item, the records including for each prior trade a trade price and trade volume for the prior trade of the traded item;
  define a comparison volume at least in part based on the desired volume:
  select by the computer one or more historical transactions;
  compare by the computer a total volume of the selected one or more historical transactions with the comparison volume;
  determine by the computer based on the comparison that the selected one or more historical transactions have a total volume that substantially corresponds to the comparison volume;
  derive by the computer statistical information regarding a distribution of prices for the selected one or more historical transactions statistics from the set of historical transactions;
  predict the future price range for the desired volume at least in part based on the statistical information regarding the distribution of prices for the selected one or more historical transactions statistics; and
  provide an output indicative of the prediction.

46. An apparatus comprising:
  a processor; and
  a computer program product residing on a computer readable storage medium for predicting a future price range for a desired volume of a traded item, the computer program product comprising instructions for causing the processor to:
  retrieve by using a computer, historical transactions represented by records of prior trades of the traded item, the records including for each prior trade a trade price and trade volume for the prior trade of the traded item;
  define a comparison volume at least in part based on the desired volume;
  select by the computer one or more historical transactions;
  compare by the computer a total volume of the selected one or more historical transactions with the comparison volume;
  determine by the computer based on the comparison that the selected one or more historical transactions have a total volume that substantially corresponds to the comparison volume;
  derive by the computer statistical information regarding a distribution of prices for the selected one or more historical transactions statistics from the set of historical transactions;
  predict the future price range for the desired volume at least in part based on the statistical information regarding the distribution of prices for the selected one or more historical transactions statistics; and
  provide an output indicative of the prediction.

47. The system of claim 46, wherein the instructions further cause the processor to select transactions from historical transaction data to generate the set of historical transactions.

48. The system of claim 46, wherein the instructions further cause the processor to generate a first graphical user interface for displaying, to a user, the output indicative of the predicted price range.

49. The system of claim 48, wherein the instructions further cause the processor to generate a second graphical user interface to receive, from the user, an input representing the traded item and an input representing the desired volume.

50. The system of claim 46, further comprising a transceiver configured to transmit the predicted price range to a network device.

* * * * *

UNITED STATES PATENT AND TRADEMARK OFFICE
CERTIFICATE OF CORRECTION

PATENT NO. : 7,761,388 B2 Page 1 of 1
APPLICATION NO. : 10/462546
DATED : July 20, 2010
INVENTOR(S) : Ani Chitaley, Anthony Delisle and Arun S. Gorur It is certified that error appears in the above-identified patent and that said Letters Patent is hereby corrected as shown below:

Col. 9, claim 1, line 1 delete "Computer-implemented" and insert --A computer-implemented--, therefor.

Col. 10, claim 1, line 6 delete "volume:" and insert --volume;--, therefor.

Col. 12, claim 37, line 4 delete "Selecting," and insert --selecting,--, therefor.

Col. 12, claim 37, line 7 delete "tile" and insert --the--, therefor.

Col. 13, claim 41, after "set of" delete "statistics".

Signed and Sealed this

Twenty-eighth Day of September, 2010

David J. Kappos
*Director of the United States Patent and Trademark Office*